United States Patent
Chambliss et al.

(10) Patent No.: US 9,423,981 B2
(45) Date of Patent: Aug. 23, 2016

(54) LOGICAL REGION ALLOCATION WITH IMMEDIATE AVAILABILITY

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL); Eliyahu Weissbrem, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 711 days.

(21) Appl. No.: 13/863,787

(22) Filed: Apr. 16, 2013

(65) Prior Publication Data
US 2014/0310457 A1    Oct. 16, 2014

(51) Int. Cl.
*G06F 12/00* (2006.01)
*G06F 3/06* (2006.01)
*G06F 11/00* (2006.01)

(52) U.S. Cl.
CPC ............ *G06F 3/0665* (2013.01); *G06F 3/0605* (2013.01); *G06F 3/067* (2013.01); *G06F 3/0619* (2013.01); *G06F 3/0631* (2013.01); *G06F 3/0689* (2013.01); *G06F 11/00* (2013.01)

(58) Field of Classification Search
CPC .......... G06F 12/00; G06F 3/06; G06F 3/0674
USPC ........................................ 711/100, 114, 154
See application file for complete search history.

(56) References Cited

U.S. PATENT DOCUMENTS

| 5,636,359 | A | 6/1997 | Beardsley et al. |
| 5,724,501 | A | 3/1998 | Dewey et al. |
| 5,784,548 | A | 7/1998 | Liong et al. |
| 5,809,320 | A | 9/1998 | Jain et al. |

(Continued)

FOREIGN PATENT DOCUMENTS

| CN | 1664793 A | 9/2005 |
| CN | 101997918 A | 3/2011 |

(Continued)

OTHER PUBLICATIONS

Ripberger et al., IBM System Storage DS8000 Storage Virtualization Overview, IBM, Apr. 13, 2010.

(Continued)

*Primary Examiner* — Tuan Thai
(74) *Attorney, Agent, or Firm* — Griffiths & Seaton PLLC

(57) ABSTRACT

Methods, apparatus and computer program products implement embodiments of the present invention that enable a computer to receive a request to allocate one or more logical regions to a logical volume, and to verify, in response to the request, an availability on one or more storage devices of a number of physical regions corresponding to the one or more requested logical regions. In response to the verification, the one or more logical regions can be activated for write operations to a cache, so that any data written to the logical regions is stored to the cache. Subsequent to activating the one or more logical regions, one or more actual physical regions can be allocated to the logical volume. Upon allocating the one or more actual physical regions, any data stored in the cache can be destaged to the one or more actual physical regions.

15 Claims, 8 Drawing Sheets

(56) References Cited

U.S. PATENT DOCUMENTS

| | | | |
|---|---|---|---|
| 5,933,860 A | 8/1999 | Emer et al. | |
| 5,960,169 A | 9/1999 | Styczinski | |
| 6,012,123 A | 1/2000 | Pecone et al. | |
| 6,021,462 A | 2/2000 | Minow et al. | |
| 6,038,641 A | 3/2000 | Zangenehpour | |
| 6,101,615 A | 8/2000 | Lyons | |
| 6,243,795 B1 | 6/2001 | Yang et al. | |
| 6,332,197 B1 | 12/2001 | Jadav et al. | |
| 6,505,216 B1 | 1/2003 | Schutzman et al. | |
| 6,529,995 B1 | 3/2003 | Shepherd | |
| 6,598,174 B1 | 7/2003 | Parks et al. | |
| 6,714,789 B1* | 3/2004 | Oh | H04W 36/32 455/422.1 |
| 6,775,738 B2 | 8/2004 | Ash et al. | |
| 7,191,304 B1 | 3/2007 | Cameron et al. | |
| 7,454,656 B2 | 11/2008 | Okada et al. | |
| 7,593,974 B2 | 9/2009 | Suzuki et al. | |
| 7,657,509 B2 | 2/2010 | Clark et al. | |
| 7,849,356 B2 | 12/2010 | Jones et al. | |
| 7,945,732 B2 | 5/2011 | Koseki | |
| 7,987,158 B2 | 7/2011 | Boyd et al. | |
| 8,103,904 B2 | 1/2012 | Hafner et al. | |
| 8,112,395 B2 | 2/2012 | Patel et al. | |
| 8,156,368 B2 | 4/2012 | Chambliss et al. | |
| 8,494,063 B1* | 7/2013 | Reudink | 370/252 |
| 9,104,599 B2 | 8/2015 | Atkisson et al. | |
| 9,146,695 B2 | 9/2015 | Galloway et al. | |
| 2002/0091897 A1 | 7/2002 | Chiu et al. | |
| 2002/0170017 A1 | 11/2002 | Busser | |
| 2003/0204690 A1 | 10/2003 | Yamada et al. | |
| 2004/0093464 A1 | 5/2004 | Hassner et al. | |
| 2004/0128269 A1 | 7/2004 | Milligan et al. | |
| 2004/0139365 A1 | 7/2004 | Hosoya | |
| 2005/0015436 A1 | 1/2005 | Singh et al. | |
| 2005/0055630 A1 | 3/2005 | Scanlan | |
| 2005/0289296 A1 | 12/2005 | Balasubramanian | |
| 2006/0123270 A1 | 6/2006 | Forhan et al. | |
| 2006/0294301 A1 | 12/2006 | Zohar et al. | |
| 2007/0016754 A1 | 1/2007 | Testardi | |
| 2007/0028145 A1 | 2/2007 | Gerhard et al. | |
| 2007/0067667 A1 | 3/2007 | Ikeuchi et al. | |
| 2007/0079083 A1 | 4/2007 | Gladwin et al. | |
| 2008/0040553 A1 | 2/2008 | Ash et al. | |
| 2008/0195807 A1 | 8/2008 | Kubo et al. | |
| 2008/0201608 A1 | 8/2008 | Forhan et al. | |
| 2008/0263274 A1* | 10/2008 | Kishi | G06F 3/0623 711/114 |
| 2009/0049050 A1 | 2/2009 | Whitehead | |
| 2009/0089612 A1 | 4/2009 | Mathew et al. | |
| 2009/0216832 A1 | 8/2009 | Quinn et al. | |
| 2010/0199125 A1 | 8/2010 | Reche | |
| 2011/0153606 A1 | 6/2011 | Kim et al. | |
| 2011/0161299 A1 | 6/2011 | Prahlad et al. | |
| 2011/0202792 A1 | 8/2011 | Atzmony | |
| 2011/0208919 A1 | 8/2011 | Chambliss et al. | |
| 2011/0208922 A1 | 8/2011 | Coronado et al. | |
| 2011/0208943 A1 | 8/2011 | Schott | |
| 2011/0225453 A1 | 9/2011 | Spry et al. | |
| 2011/0258391 A1 | 10/2011 | Atkisson et al. | |
| 2011/0282835 A1 | 11/2011 | Cannon et al. | |
| 2011/0283062 A1 | 11/2011 | Kumagai et al. | |
| 2012/0110257 A1* | 5/2012 | Enohara | G06F 3/0611 711/111 |
| 2012/0210060 A1 | 8/2012 | Acuna et al. | |
| 2013/0024627 A1 | 1/2013 | Benhase et al. | |
| 2014/0019421 A1 | 1/2014 | Jagadeesan | |
| 2014/0310244 A1 | 10/2014 | Chambliss et al. | |
| 2014/0310456 A1 | 10/2014 | Chambliss et al. | |
| 2014/0310464 A1 | 10/2014 | Chambliss et al. | |
| 2014/0310465 A1 | 10/2014 | Chambliss et al. | |
| 2014/0310489 A1 | 10/2014 | Chambliss et al. | |
| 2014/0310557 A1 | 10/2014 | Chambliss et al. | |
| 2015/0268883 A1 | 9/2015 | Chambliss et al. | |
| 2015/0268884 A1 | 9/2015 | Chambliss et al. | |
| 2015/0269026 A1 | 9/2015 | Chambliss et al. | |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Rodeh, B-trees, Shadowing and Clones, ACM Transactions on Computational Logic, vol. V, No. N, IBM, Aug. 2007.

Sivathanu et al., "Improving Storage System Availability with D-GRAID," ACM Transactions on Storage, vol. 1, No. 2, May 2005, http://pages.cs.wisc.edu/~muthian/dgraid-tos.pdf.

* cited by examiner

US 9,423,981 B2

LOGICAL REGION ALLOCATION WITH IMMEDIATE AVAILABILITY

FIELD OF THE INVENTION

The present invention relates generally to data storage, and specifically to logical volume management.

BACKGROUND

In computer storage systems (also referred to herein as storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region, also referred to herein as a partition, is a sequence of bytes having a specific length, typically one megabyte) into larger virtual regions that administrators can re-size or move, potentially without interrupting system use.

To manage a given volume, a partition table can be utilized to define the relationship between a logical address of a logical volume and physical regions (also known as blocks and partitions) on the physical storage device. Upon receiving a request to perform an input/output (I/O) operation at a specific logical address on the given volume, a storage system can utilize the partition table identify the physical location on a storage device that corresponds to the specific logical address.

SUMMARY

There is provided, in accordance with an embodiment of the present invention a method, including receiving, by a processor, a request to allocate one or more logical regions to a logical volume, verifying, in response to the request, an availability on one or more storage devices of a number of physical regions corresponding to the one or more requested logical regions, in response to the verification, activating the one or more logical regions for write operations, and subsequent to activating the one or more logical regions, allocating, to the logical volume, one or more actual physical regions.

There is also provided, in accordance with an embodiment of the present invention an apparatus, including one or more storage devices, and a processor configured to receive a request to allocate one or more logical regions to a logical volume, to verify, in response to the request, an availability on the one or more storage devices of a number of physical regions corresponding to the one or more requested logical regions, to activate, in response to the verification, the one or more logical regions for write operations, and to allocate to the logical volume, subsequent to activating the one or more logical regions, one or more actual physical regions.

There is further provided, in accordance with an embodiment of the present invention a computer program product, the computer program product including a non-transitory computer readable storage medium having computer readable program code embodied therewith, the computer readable program code including computer readable program code configured to receive a request to allocate one or more logical regions to a logical volume, computer readable program code configured to verify, in response to the request, an availability on one or more storage devices of a number of physical regions corresponding to the one or more requested logical regions, computer readable program code configured to activate, in response to the verification, the one or more logical regions for write operations, and computer readable program code configured to allocate to the logical volume, subsequent to activating the one or more logical regions, one or more actual physical regions.

BRIEF DESCRIPTION OF THE DRAWINGS

The disclosure is herein described, by way of example only, with reference to the accompanying drawings, wherein.

DETAILED DESCRIPTION OF EMBODIMENTS

Static partitioning and dynamic partitioning are techniques used to allocate physical regions (also known as partitions) to logical volumes. In embodiments described herein logical volumes comprise logical regions that correspond to physical regions on one or more storage devices. In static partitioning, physical regions on a storage device are typically allocated to one or more logical volumes upon defining the one or more logical volumes. In dynamic partitioning, the physical regions are allocated to one or more logical volumes on an as-needed basis.

Adding data to a statically partitioned logical volume is typically faster than adding data to a dynamically partitioned logical volume, since the dynamically partitioned logical volume may need to request additional physical regions before the data can be written (i.e., added) to the volume. On the other hand, dynamically partitioned logical volumes are typically more space efficient than statically partitioned logical volumes, since physical regions can be allocated on an as-needed basis.

Embodiments of the present invention provide methods and systems for enhancing the performance of systems implementing dynamically partitioned logical volumes. In some embodiments, in response to receiving a request to allocate one or more logical regions to a logical volume, an availability of a number of physical regions corresponding to the one or more requested logical regions can be verified, and in response to the verification, the one or more logical regions can be activated for write operations.

As explained hereinbelow, once the logical regions are activated, any requests to write data to the requested regions can be performed by storing the data to a cache. At some later time, one or more actual physical regions can be allocated to the logical volume, and the data can be destaged from the cache to the one or more actual physical regions. Therefore, embodiments of the present invention can improve performance to dynamically allocated volumes, since write operations can be performed before completing the allocation of actual physical tracks to the logical volume.

Figure 1:
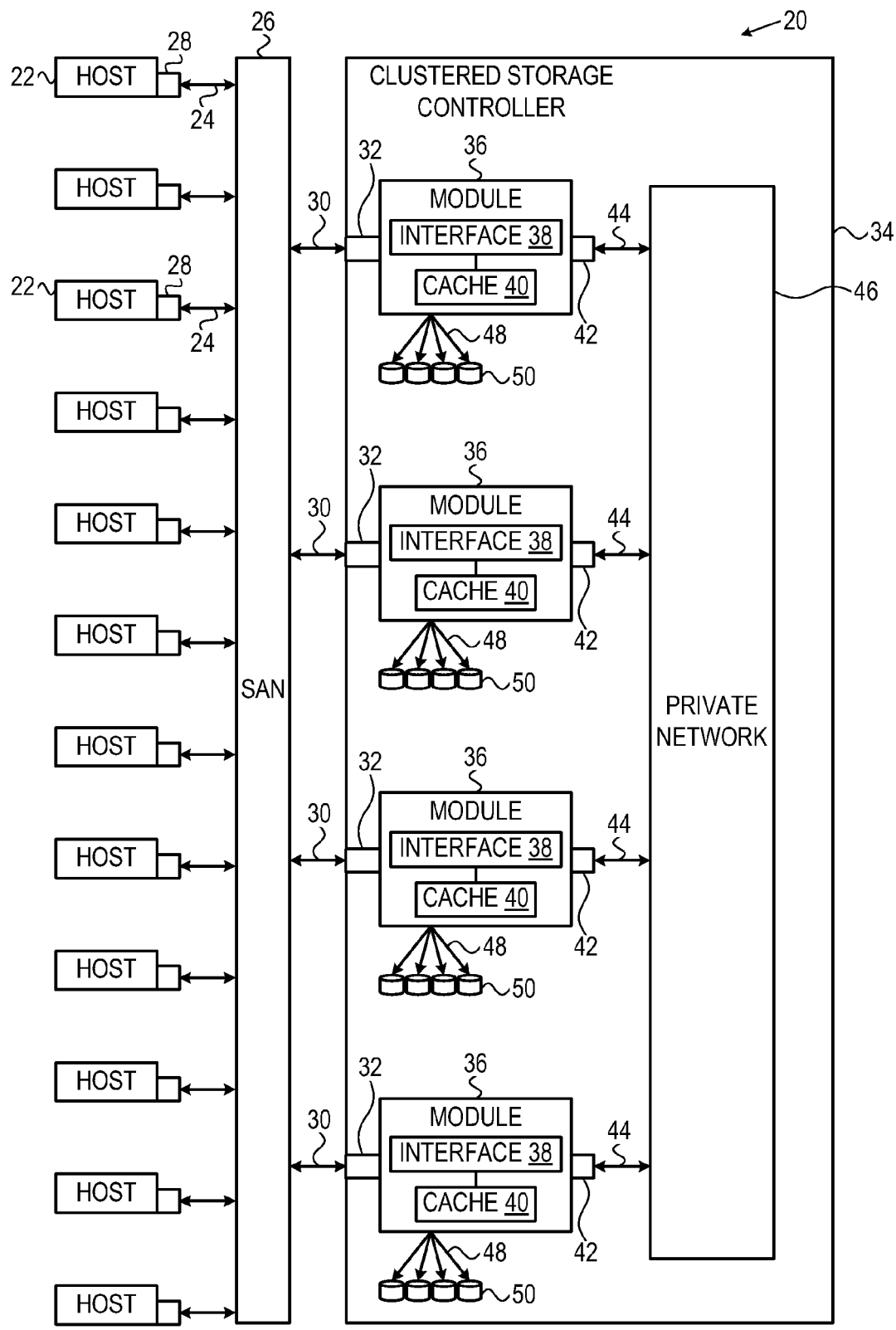
FIG. 1 is a block diagram that schematically illustrates a storage system, in accordance with an embodiment of the present invention.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512. bytes. For example, a 10. KB data record used in a data processing application on a given host computer 22 would require 20. blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
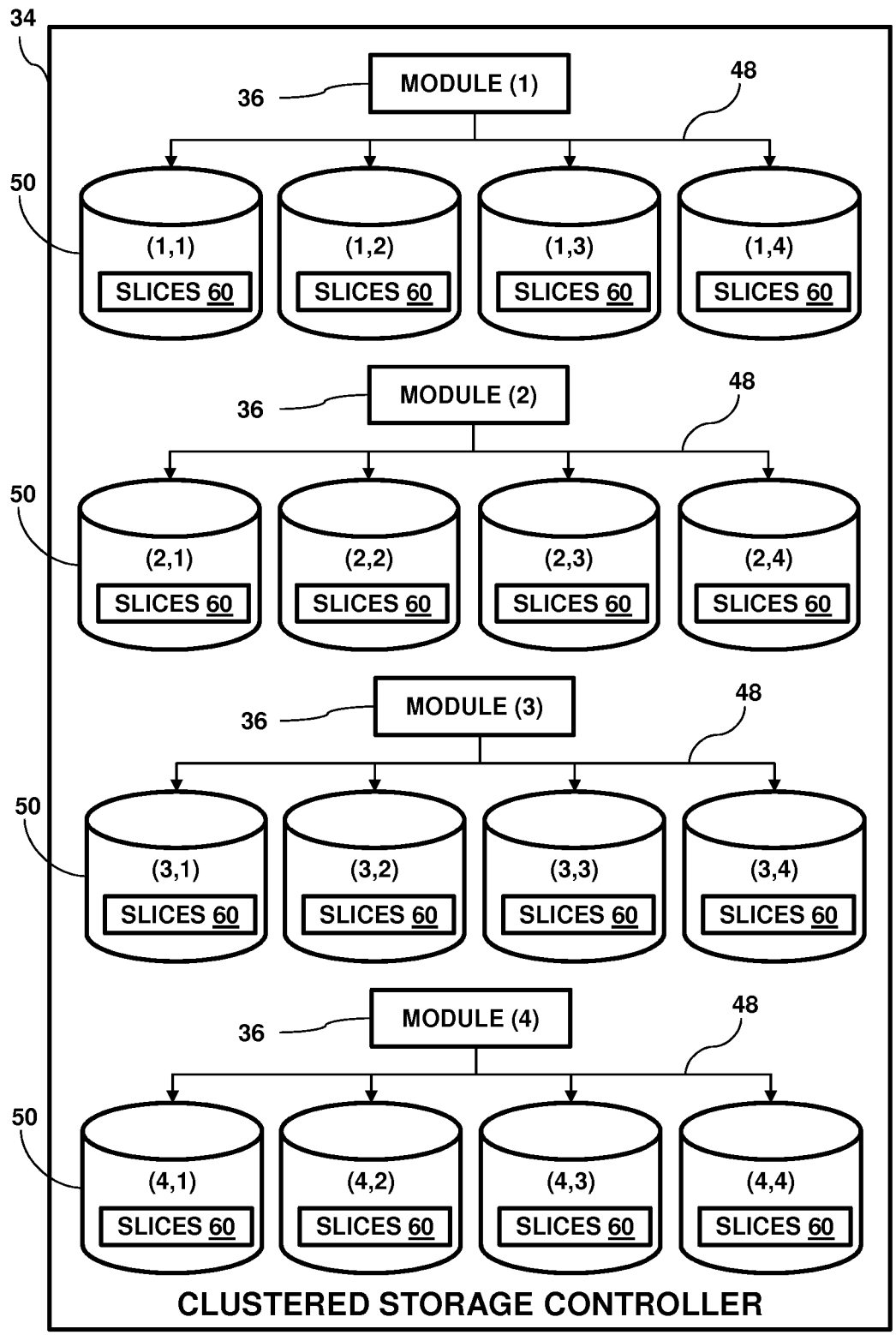
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A, B), where A is defined above, and where B is a number representing a given storage device 50 coupled to the given module via data connection 48. For example, storage devices 50(3,1), 50(3,2), 50(3,3) and 50(3,4) are coupled to module 36(3) via data connection 48.

Figure 3A:
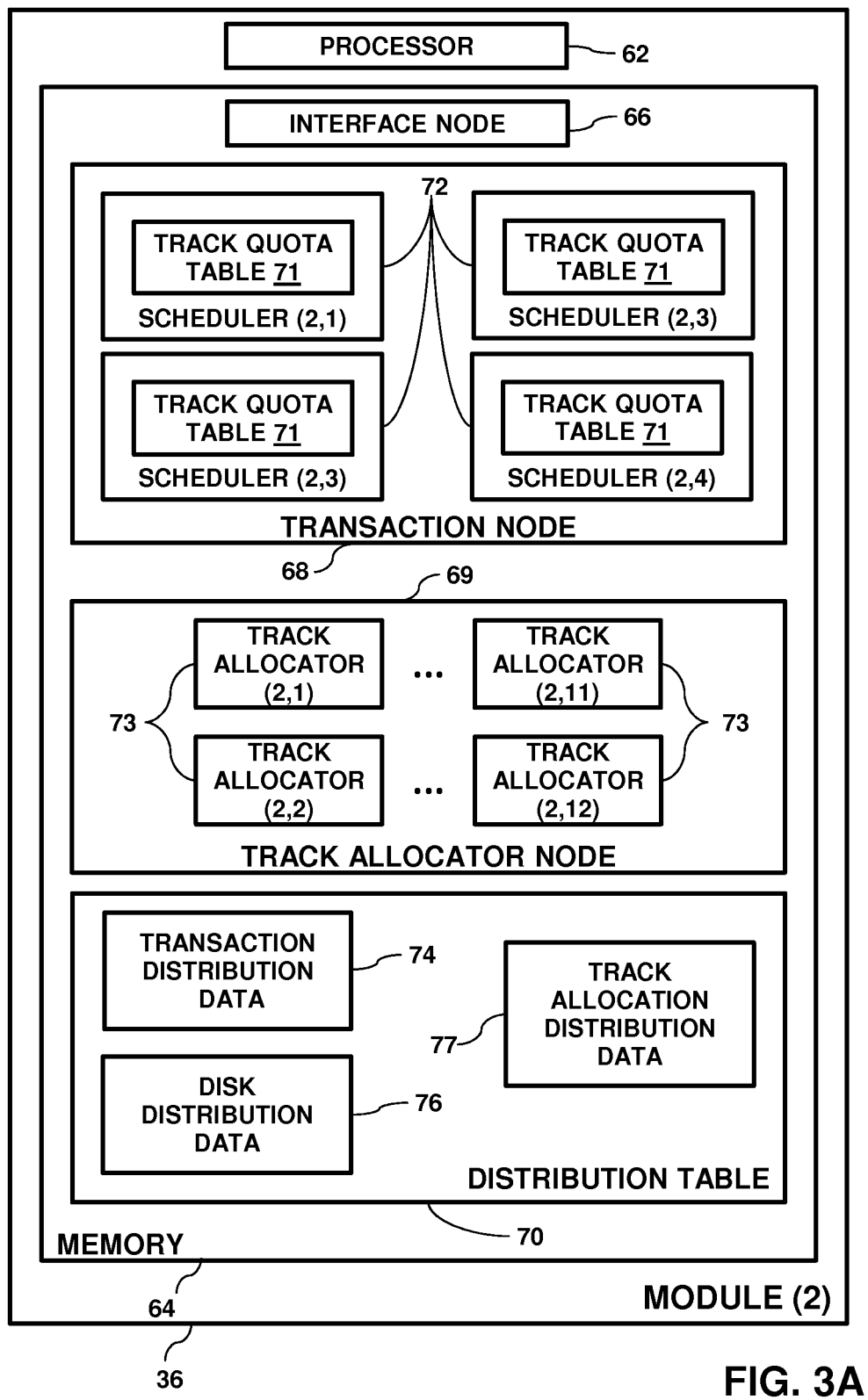
FIGS. 3A-3D, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68, a track allocator node 69, and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A, C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device 50 stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store a first copy of a given slice 60 on a primary storage device 50, and an additional copy of the given slice on one or more secondary storage devices 50. In the event of a failure of the primary storage device, processor 62 can reconfigure one of the secondary storage devices to function as the primary storage device, thereby ensuring the continuous availability of data stored in storage controller 34.

Track Allocator node 69 comprises a software application that processes requests to allocate physical regions on storage devices 50 via track allocators 73, each of which manages a given storage device 50. While the configuration of transaction node 68 shown in FIG. 3A comprises twelve track allocators 73, any number of track allocators is considered to be within the spirit and scope of the present invention. In some embodiments, processor 62 may execute each track allocator 73 on a separate thread (also known as a logical core) of the processor.

In embodiments described herein, each track allocator 73 may be referenced by an ordered pair (A, F), where A is defined above, and F is a number representing a given track allocator 73 executing within the given module.

Processor 62 can store associations between the slices, the schedulers and the storage devices to distribution table 70. Distribution table 70 comprises transaction distribution data 74, disk distribution data 76 and track allocation distribution data 77. Transaction distribution data 74 can be configured to store associations between the slices and the schedulers, disk distribution data 76 can be configured to store associations between the slices and the storage devices, and track allocation distribution data 77 can be configured to store associations between the storage devices and track allocators 73.

In the example shown in FIG. 3A, each scheduler 72 comprises a track quota table 71. Track quota table 71 comprises a counter (not shown) for each storage device 50. In a given scheduler 72, a given counter for a given storage device 50 indicates a number of tracks currently reserved for use by the given scheduler. In the event the given counter reaches a low threshold, the given scheduler can convey, to the track allocator associated with the given storage device, a request to reserve additional tracks for the given scheduler. Such a request does not reserve specific tracks but only ensures that the track allocator will successfully allocate that number of tracks when it receives requests from the given scheduler.

Figure 3B:
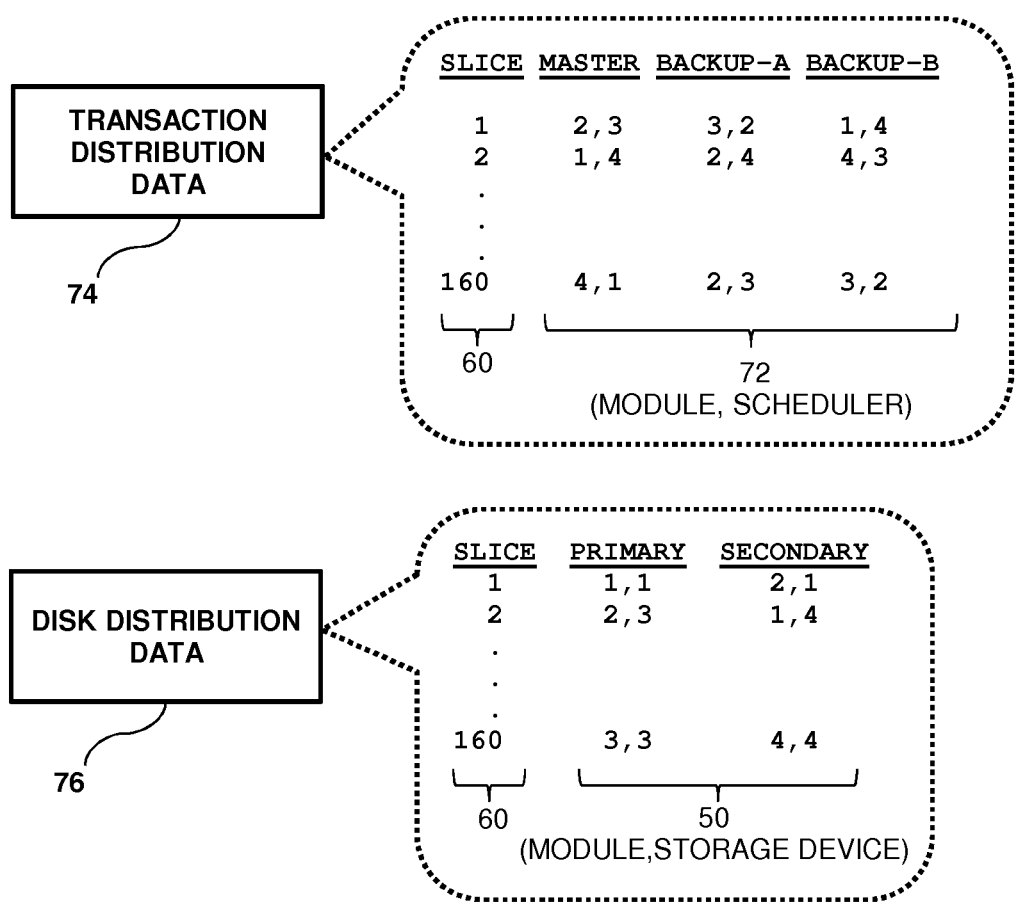

FIG. 3B is block diagram that schematically shows example entries in transaction distribution data 74 and disk distribution data 76, in accordance with an embodiment of the present invention. In the example shown in FIG. 3B, each slice 60 is associated with a master scheduler 72 and two backup schedulers 72, and a primary and a secondary storage device 50.

In the embodiments described herein, each slice may be referenced by an identifier (D), where D is a number representing a given slice 60. In the configuration shown in FIG. 3B-3D, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160.

As shown in transaction distribution data 74, scheduler 72(2,3) is configured as the master scheduler and schedulers 72(3,2) and 72(1,4) are configured as the backup schedulers (i.e., BACKUP-A and BACKUP-B as shown the figure) for slice 160(1). Additionally, as shown in disk distribution data 76 for slice 60(1), storage device 50(1,1) is configured as a primary storage device and storage device 50(2,1) is configured as a secondary storage device.

Figure 3C:
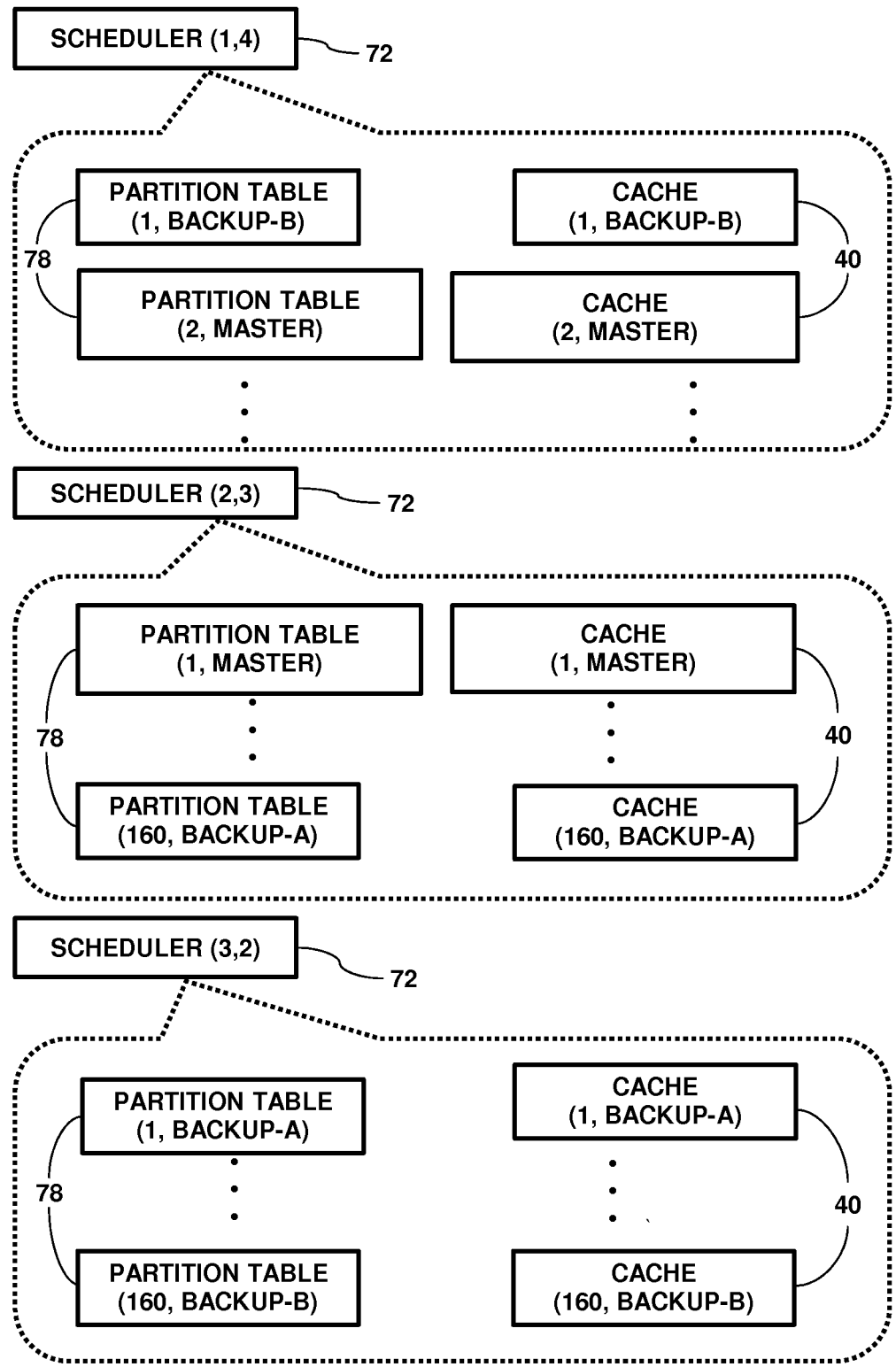

While the configuration of disk distribution data in FIG. 3C shows slices 60 stored Redundant Array of Inexpensive Disks (RAID) 10. configuration (i.e., each slice 60 is mirrored once among multiple storage devices 50), other storage configurations are considered to be within the spirit and scope of the present invention. For example, slices 60 may be stored in a RAID 6 (e.g., a RAID 6 6+2. or a RAID 6 8+2) configuration.

As shown in the Figures, for a given slice 160, the master scheduler, the backup scheduler(s), the primary storage device and the secondary storage device(s) can be distributed among different modules 36 of storage system 20. Additionally, each module 36 may store any number (including zero) of master and backup schedulers 72.

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D, E), where D is a number representing a given slice 60, and E describes a role of a given partition table 78, and each cache 40 may be referenced by an ordered pair (D, F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

Figure 3D:
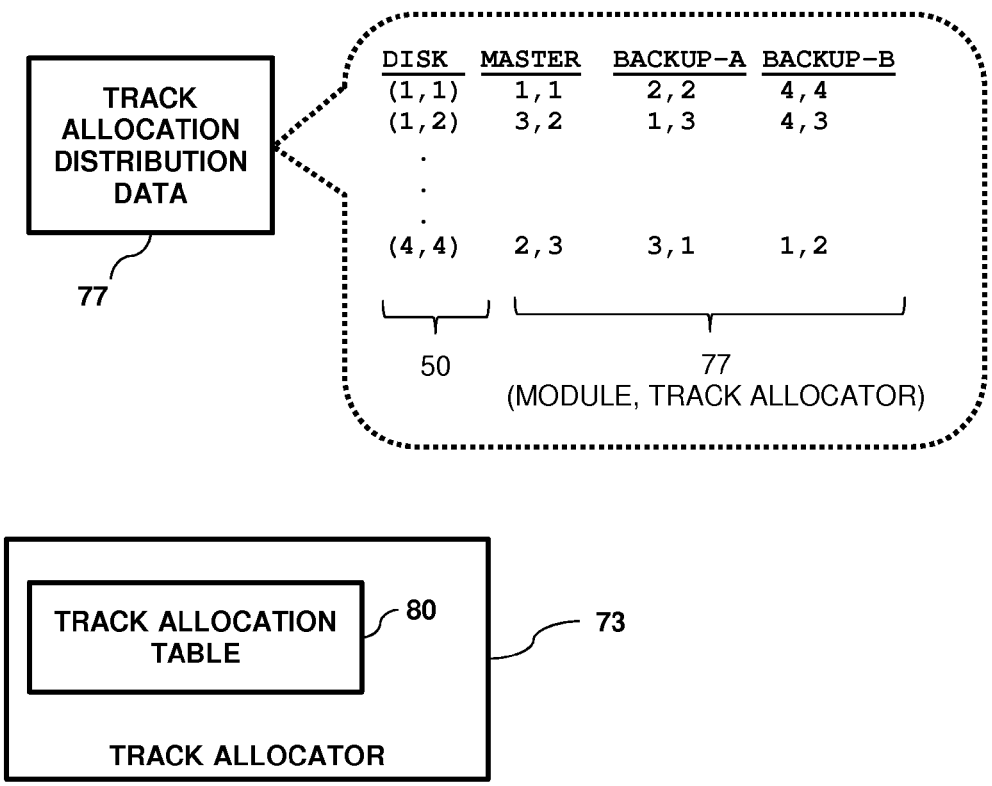

FIG. 3D is a block diagram that schematically shows track allocation distribution data 77 and a given track allocator 73, in accordance with an embodiment of the present invention. In the configuration shown in the figures, each storage device 50 is associated with a master track allocator 73 and two backup track allocators 73.

In the example shown in FIG. 3D, track allocator 73(3,2) is the master track allocator for storage device 50(1,2). Therefore, if processor 62 receives a write request for a given logical region of a given slice that is associated with storage devices 50(1,2) and 50(4,4) (i.e., as primary and secondary), the partition table for the given slice may indicate that the logical region does not have any corresponding physical regions allocated on the associated storage devices. To allocate the corresponding physical regions, processor 62 can call track allocators 73(1,1) and 73(2,3) to allocate the necessary physical region(s) on storage devices 50(1,1) and (4,4).

Track allocator 73 comprises a track allocation table 80.

In some embodiments, track allocation table 80 may comprise a list of available physical regions (i.e., unassigned to any slice 60) of the associated storage device 50. In operation, as described hereinbelow, processor 62 may query a given track allocation table 80 to determine the number of available physical regions on the associated storage device 50. Additionally, as explained hereinbelow, processor 62 may "reserve" a specific number of physical regions on the associated storage device 50.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Allocating Instantly Available Logical Regions

Figure 4:
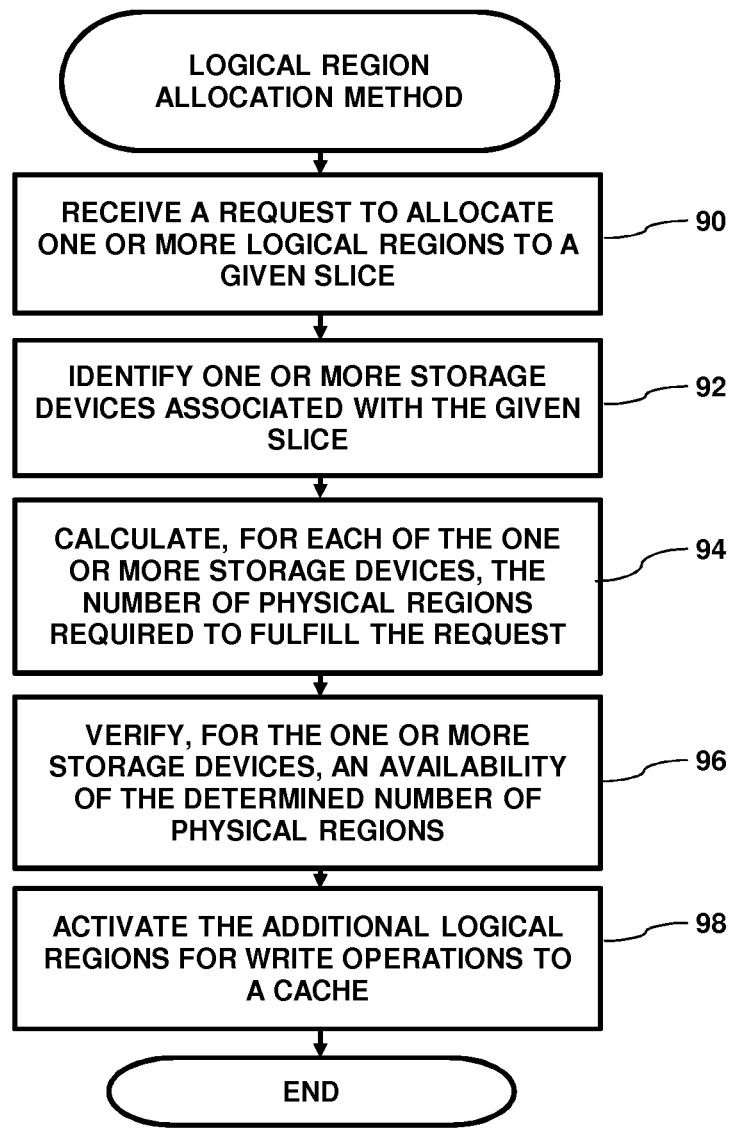
FIG. 4 is a flow diagram that schematically illustrates a method of allocating logical regions to a logical volume, in accordance with an embodiment of the present invention.

FIG. 4 is a flow diagram that schematically illustrates a method of allocating logical regions to a logical volume, in accordance with an embodiment of the present invention. In a receive step 90, processor 62 receives a request to allocate one or more logical regions to a given slice 60 of a given logical volume. As described supra, the request may be as a result of a write request to a logical region of the given volume, and the partition table associated with the logical region indicates that there are no physical regions corresponding to the logical region.

In a first identification step 92, processor 62 identifies, via transaction distribution data 74 and disk distribution data 76, one or more storage devices 50 associated with the given slice. In a calculation step 94, processor 62 calculates a number of physical regions that are required to fulfill the logical region allocation request, and in a verification step 96, verifies, in the track quota table of the scheduler for the given slice, the availability of the calculated number of physical regions. Upon verifying the availability of the calculated number of physical regions, processor 62 can subtract the calculated number from the appropriate counter in the track quota table.

In the embodiments described herein, each logical region may correspond to one or more physical regions on a given storage device 50. Alternatively, each physical region on a given storage device 50 may correspond to one or more logical regions. The track allocation table(s) 80 of the identified track allocator(s) 73 may also be referred to herein as the identified track allocation table(s) 80.

By verifying the availability of the calculated number of physical regions with a given quota table 71, processor 62 implicitly reserves the calculated number of physical regions in the identified track allocation table(s) 80. In response to the verification and the reservation, in an activation step 98, processor 62 activates the allocated one or more logical regions for write operations to cache 40, and the method ends. The activation enables processor 62 to process write operations to the allocated one or more logical regions. In other words, processor 62 can process requests to write data to the one or more allocated logical regions prior to the allocated one or more logical regions having any corresponding physical regions on storage devices 50.

To process a request, received from a given host computer 22, to write data to the one or more allocated logical regions, processor 62 stores the data to a given cache 40, and upon storing the data to the cache, the processor conveys, to the given host computer, an acknowledgement indicating a completion of the write request.

Figure 5:
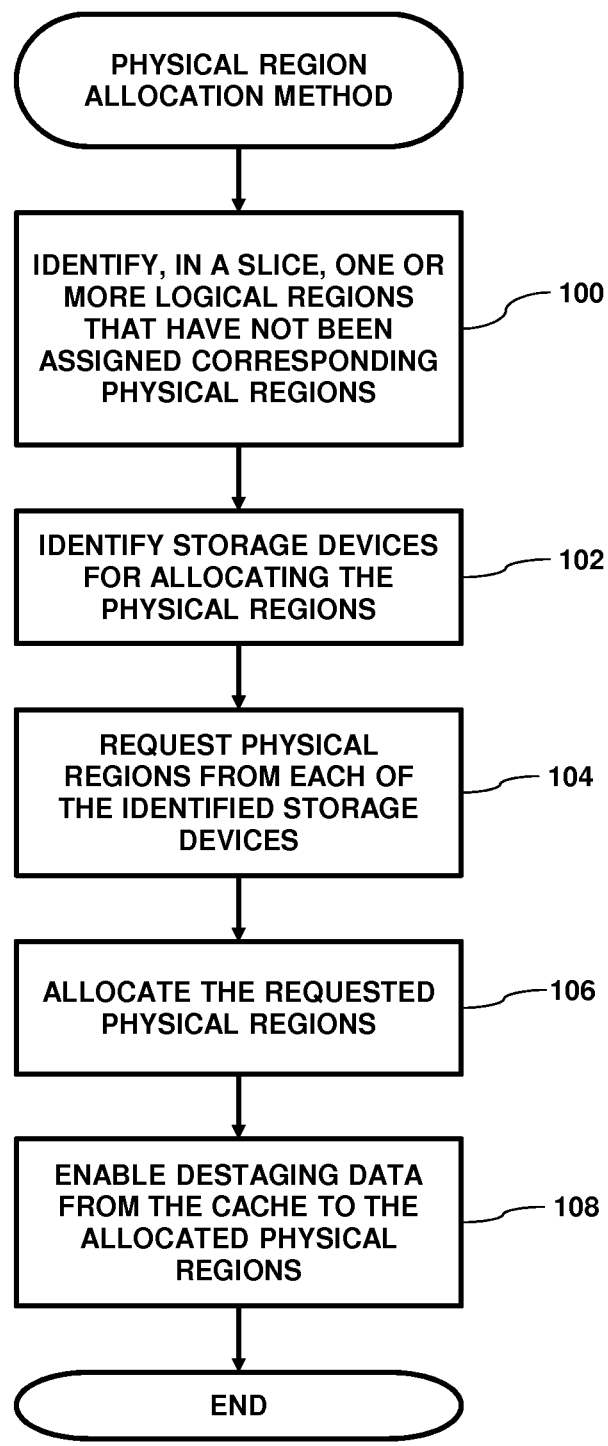
FIG. 5 is a flow diagram that schematically illustrates a method of allocating physical regions corresponding to the logical regions, in accordance with an embodiment of the present invention.

FIG. 5 is a flow diagram that schematically illustrates a method of allocating physical regions on storage devices 50, in accordance with an embodiment of the present invention. The physical regions correspond to the logical regions previously allocated in steps of the flow diagram described in FIG. 4. In the example described herein, the logical tracks are associated with a given slice 60.

In a first identification step 100, processor 62 identifies, in the given slice, one or more logical regions that have not been assigned corresponding physical regions. In a second identification step 102, processor 62 queries disk distribution table 76 to identify one or more storage devices 50 that are associated with the given slice, and identifies one or more track allocators for the identified one or more storage devices 50. In a request step 104, processor 62 conveys, to each identified track allocator 73, a track allocation request, and in an allocation step 106, the one or more associated track allocators allocate one or more actual physical regions corresponding to the one or more identified logical regions.

As described supra, upon activating logical regions, processor 62 can process a request to write data to the logical region(s) by storing the data to a given cache 40. Finally, in a destage step 108, processor 62 enables a destaging of any data in the given cache 40 to the allocated actual physical regions, and the method ends.

In operation, in response to a request to allocate logical regions, processor may allocate corresponding physical regions positioned on multiple storage devices 50. For example, if a logical volume is stored in a RAID 6 8+2. configuration, then any request to allocate logical regions to the volume requires that corresponding regions are allocated on ten storage devices 50. In some embodiments, processor 62 may divide the track allocation request into smaller batches of physical region allocations. For example, in the RAID 6 8+2. configuration described supra, processor 62 may divide the logical region allocation request into ten physical region allocation requests that can be performed serially.

In other words, when allocating physical regions on a first and a second storage device 50, physical regions can be allocated on the second storage device only after physical regions are successfully allocated on the first storage device. This configuration enables processor 62 to easily "roll back" (or "roll forward") the physical region allocations in the event of a hardware and/or software failure during the allocation, in order to ensure that the allocation state is consistent across storage controller 34.

In operation, scheduler 72 may "batch up" multiple allocation requests for a given allocator 73, and submit a single allocation request upon the number of requested tracks reaches a defined threshold (or the requests have been pending for a specific time period). A batch may include allocation requests that are associated with multiple logical regions. Batching up the allocation requests can reduce message traffic on storage controller 34. Additionally, batching up the requests can help simplify recovery from a hardware and/or software failure that occurred while processing the (batched) request, since only a single allocation request was being processed at the time of the error.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   receiving, by a processor, a request to allocate one or more logical regions to a logical volume;
   verifying, in response to the request, an availability on one or more storage devices of a number of physical regions corresponding to the one or more requested logical regions;
   in response to the verification, activating the one or more logical regions for write operations; and
   subsequent to activating the one or more logical regions, allocating, to the logical volume, one or more actual physical regions;
      wherein verifying the number of the physical regions comprises calculating the number of physical regions corresponding to the one or more logical regions, and reserving the calculated number of physical regions on the one or more storage devices, and the one or more logical regions correspond to actual physical regions positioned on more than one of the storage devices, and wherein allocating the physical regions comprises serially allocating the actual physical regions on each of the storage devices.

2. The method according to claim 1, and comprising receiving, upon activating the one or more logical regions, a request to write data to one of the one or more logical regions, storing the data to a memory, and conveying an acknowledgement indicating a completion of the request.

3. The method according to claim 2, wherein the memory comprises a cache.

4. The method according to claim 3, and comprising destaging, from the cache, the data to the one or more actual physical regions.

5. The method according to claim 1, wherein each of the one or more storage devices is selected from a list comprising a hard disk drive and a solid state disk drive.

6. An apparatus, comprising:
   one or more storage devices; and
   a processor configured to receive a request to allocate one or more logical regions to a logical volume, to verify, in response to the request, an availability on the one or more storage devices of a number of physical regions corresponding to the one or more requested logical regions, to activate, in response to the verification, the one or more logical regions for write operations, and to allocate to the logical volume, subsequent to activating the one or more logical regions, one or more actual physical regions; wherein the processor is configured to verify the number of the physical regions by calculating the number of physical regions corresponding to the one or more logical regions, and reserving the calculated number of physical regions on the one or more storage devices, and the one or more logical regions correspond to actual physical regions positioned on more than one of the storage devices, and wherein the processor is configured to allocate the physical regions by serially allocating the actual physical regions on each of the storage devices.

7. The apparatus according to claim 6, an comprising a memory, and wherein the processor is configured, upon activating the one or more logical regions, to receive a request to write data to one of the one or more logical regions, to store the data to the memory, and to conveying an acknowledgement indicating a completion of the request.

8. The apparatus according to claim 7, wherein the memory comprises a cache.

9. The apparatus according to claim 8, wherein the processor is configured to destage, from the cache, the data to the one or more actual physical regions.

10. The apparatus according to claim 6, wherein each of the one or more storage devices is selected from a list comprising a hard disk drive and a solid state disk drive.

11. A computer program product, the computer program product comprising:
  a non-transitory computer readable storage medium having computer readable program code embodied therewith, the computer readable program code comprising:
  computer readable program code configured to receive a request to allocate one or more logical regions to a logical volume;
  computer readable program code configured to verify, in response to the request, an availability on one or more storage devices of a number of physical regions corresponding to the one or more requested logical regions;
  computer readable program code configured to activate, in response to the verification, the one or more logical regions for write operations; and
  computer readable program code configured to allocate to the logical volume, subsequent to activating the one or more logical regions, one or more actual physical regions;
  wherein the computer readable program code is configured to verify the number of the physical regions by calculating the number of physical regions corresponding to the one or more logical regions, and reserving the calculated number of physical regions on the one or more storage devices, and the one or more logical regions correspond to actual physical regions positioned on more than one of the storage devices, and wherein the processor is configured to allocate the physical regions by serially allocating the actual physical regions on each of the storage devices.

12. The computer program product according to claim 11, and comprising computer readable program code configured to receive, upon activating the one or more logical regions, a request to write data to one of the one or more logical regions, to store the data to a memory, and to convey an acknowledgement indicating a completion of the request.

13. The computer program product according to claim 12, wherein the memory comprises a cache.

14. The computer program product according to claim 13, and computer readable program code configured to destage, from the cache, the data to the one or more actual physical regions.

15. The computer program product according to claim 11, wherein each of the one or more storage devices is selected from a list comprising a hard disk drive and a solid state disk drive.

* * * * *